Aug. 12, 1969  A. C. LODRINI  3,460,355
RING CLAMP

Filed Oct. 6, 1967  3 Sheets-Sheet 1

INVENTOR.
Albert C. Lodrini
BY
Polachek & Saulsbury
ATTORNEYS

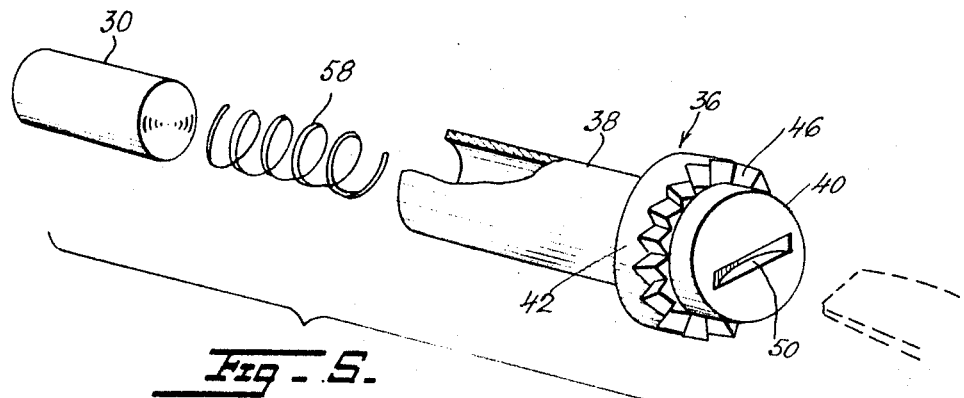
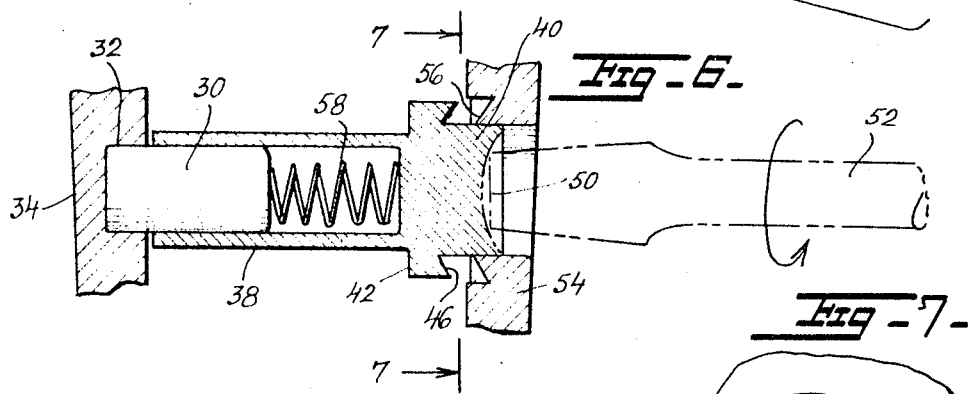
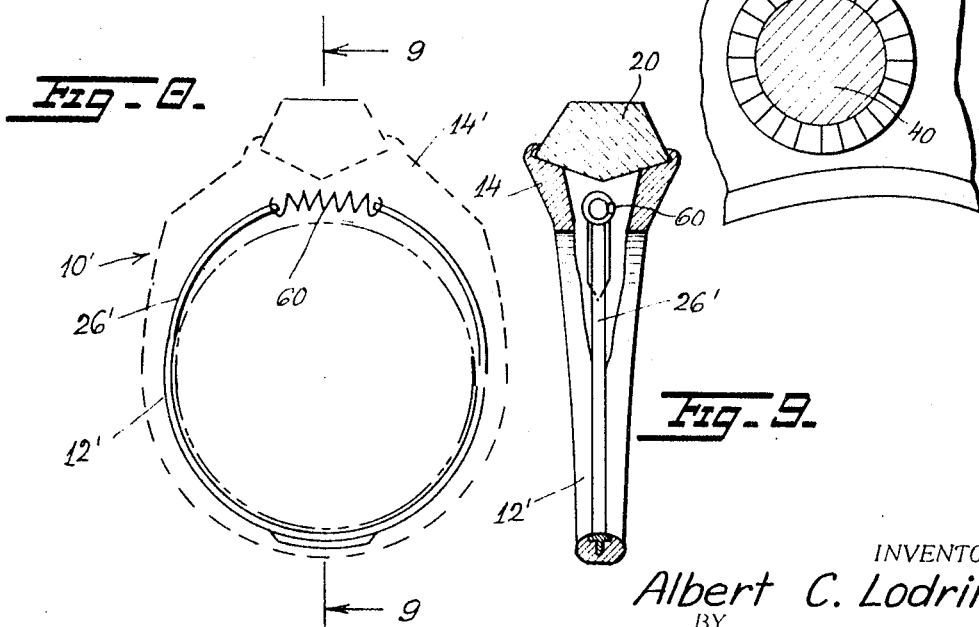

Aug. 12, 1969 A. C. LODRINI 3,460,355
RING CLAMP
Filed Oct. 6, 1967 3 Sheets-Sheet 3
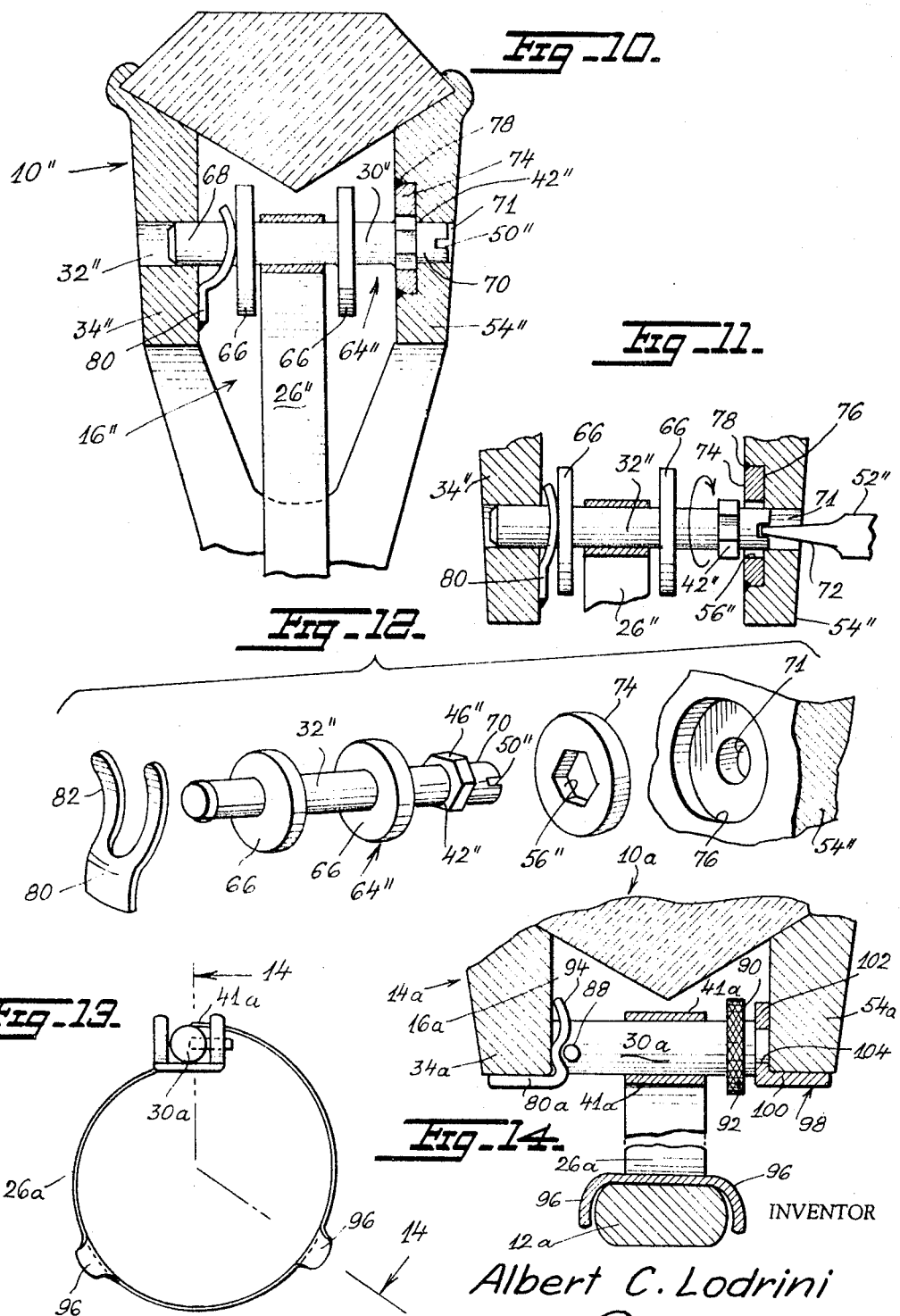
INVENTOR
Albert C. Lodrini
BY
Polachek & Saulsbury
ATTORNEYS _United States Patent Office_  3,460,355
Patented Aug. 12, 1969

3,460,355
RING CLAMP
Albert C. Lodrini, 697 Hillcrest Road,
Westwood, N.J. 07675
Filed Oct. 6, 1967, Ser. No. 673,323
Int. Cl. A44c 9/02
U.S. Cl. 63—15.6                              5 Claims

ABSTRACT OF THE DISCLOSURE

A finger ring having a device for readily narrowing the diameter of the band of the ring. The device includes a split auxiliary band embedded in a groove in the inner periphery of the main band of the ring. The split ends of the auxiliary band are anchored to a turntable and slidable clutch member, or spool, slidable clutch member or spool being supported in a chamber in the head portion of the band of the ring. The clutch member or spool is adapted to be slid inwardly and turned by a turning tool.

---

This invention relates to new and useful improvements in finger rings and more particularly a finger ring having an auxiliary band for preventing displacement of the ring on the finger.

An important object of the present invention is to provide a finger ring with a device for readily narrowing the diameter of the inner periphery of the band of the ring.

A specific object of the invention is to provide the main band of a finger ring with a split auxiliary band on the inner surface of the main band with means for narrowing the diameter of said auxiliary band.

FIG. 5 is a spread perspective view taken of the mechanism for narrowing the diameter of the auxiliary band parts being shown, broken away.

FIG. 6 is a view similar to FIG. 4 showing the narrowing mechanism in moved position, a turning tool being shown in dotted lines in operative position.

FIG. 7 is a cross-sectional view taken on the plane of the line 7—7 of FIG. 6.

FIG. 8 is a view similar to FIG. 2 of a ring embodying a modified form of the invention.

FIG. 9 is a vertical sectional view taken on the plane of the line 9—9 of FIG. 8.

FIG. 10 is a view similar to FIG. 4 of a ring embodying another modified form of the invention.

FIG. 11 is a view similar to FIG. 10 of a fragment thereof, showing the auxiliary band-turning mechanism moved to operative position, showing a turning tool in operative position.

FIG. 12 is a disassembled perspective view of the auxiliary band turning mechanism.

FIG. 13 is a side elevational view of an auxiliary band embodying still another modified form of the invention.

FIG. 14 is a vertical sectional view taken on the plane of the line 14—14 of FIG. 13 showing the stone in position.

Figure 1:
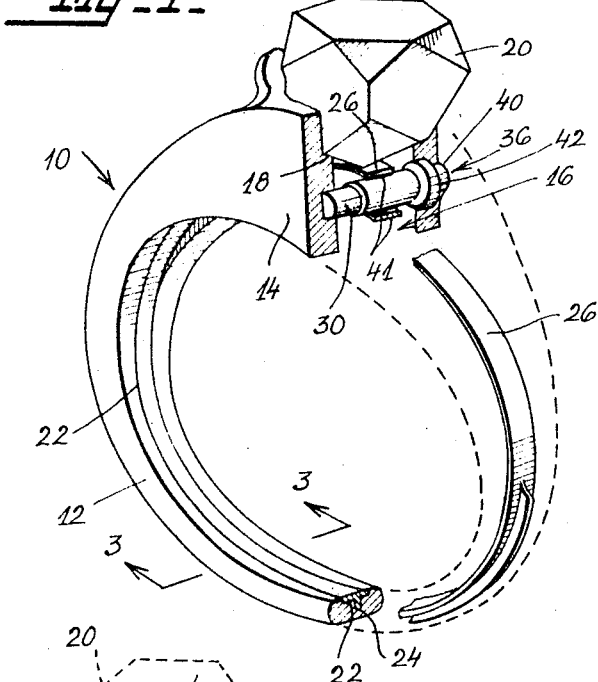
FIGURE 1 is a perspective view of a finger ring embodying one form of the invention, parts being shown, broken away.
Figure 3:
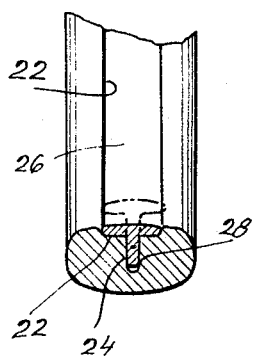
FIG. 3 is a cross sectional view taken on the plane of the line 3—3 of FIG. 1.
Figure 2:
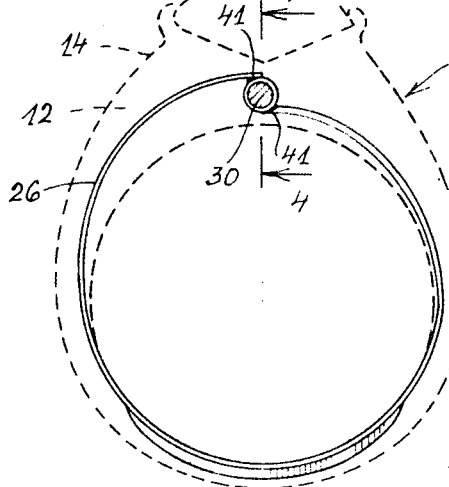
FIG. 2 is a phantom side view of the finger ring of FIG. 1 showing the position of the auxiliary band in full lines on the main ring band.

Referring now in detail to the various views of the drawings, in FIG. 1 a finger ring made in accordance with the invention is shown and designated generally at 10. The ring 10 has a circular solid main band 12 with an enlarged head portion 14 at the top as viewed in FIG. 1. The head portion 14 is formed with an opening constituting a chamber 16. The opening extends through the head portion from top to bottom thereof. A horizontally disposed shoulder 18 is formed around the inside of the chamber midway its height, serving as a seat for supporting a diamond or stone 20 in exposed position. The inner periphery of the band 12, from the ends of the chamber therearound, is formed with a central groove 22 therealong. The groove 22 is rectangular in cross-section for the major portion of its length, being T-shaped in cross-section as indicated at 24, along the bottom portion of the band 12.

In accordance with the invention an auxiliary split metal band 26 narrower than the band 12 is embedded in the groove 22. The band is formed with an arcuate shaped flange 28 along its bottom portion as viewed in FIG. 1 to permit the band to fit in the T-shaped cross-section 24 of the groove. Mechanism is provided for deforming and narrowing the diameter of the auxiliary band. This mechanism is mounted in the chamber 16 and includes a cylindrical pin 30 disposed crosswise of the chamber, with one end journalled in a recess 32 formed in the inner surface of one wall 34 of the chamber 16, the other end extending outwardly into the chamber. A clutch device 36 is slidably and rotatably mounted on the outwardly protruding portion of the pin. The clutch device 36 comprises a tubular body 38 formed with a closure head 40 at one end thereof, the open end being supported by the outwardly protruding portion of the pin. The head 40 is formed with a collar 42 on its inner end. The outer face of the collar is formed with teeth 46. The outer face of the head 40 is formed with a collar 42 on its inner end. The outer face of the head 40 is formed with a cross slot 50 for accommodating a turning tool such as the tool 52 shown in FIG. 6. The inner surface of the opposite wall 54 of the chamber 16 is formed with teeth 56 opposite the recess 32 in the wall 34 for coacting with the teeth 46 on the collar 48. A compression spring 58 is interposed between the face of the outwardly protruding portion of the pin 30 and the inner end or base of the head 40. Both ends of the auxiliary band 26 are anchored to the tubular body 38 by welding as indicated at 41, 41.

Figure 4:
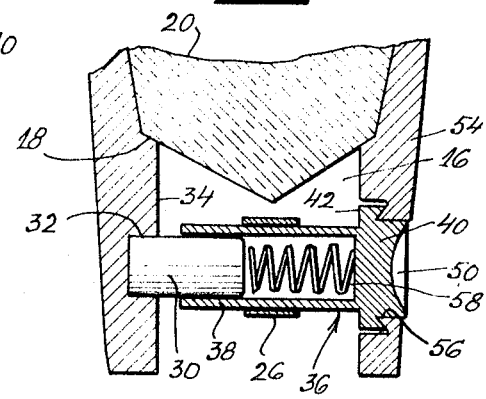
FIG. 4 is a cross-sectional view taken on the plane of the line 4—4 of FIG. 2.

In use, the main band 12 of the ring 10 is slipped over the finger of the wearer with the auxiliary band 26 encircling the finger. If the band 12 does not frictionally grip the surface of the finger sufficiently, it is only necessary by means of the tool 52 to push the clutch member 36 inwardly beyond the wall 54 of the chamber and then turn the tubular body 38, carrying the anchored ends of the auxiliary band around with it, whereby the diameter of the auxiliary band is narrowed gripping the finger of the wearer thereby preventing turning of the ring 10 on the finger and preventing the ring from sliding off the finger. When tool pushing and turning pressure on the head 40 is released, the compression spring 58 will urge the clutch member 36 outwardly to teeth meshing position as shown in FIG. 4.

In FIGS. 8 and 9, a finger ring 10' with a modified form of the invention is shown. In this form of the invention, the auxiliary band 26' is self-adjusting by means of a compression spring 60, interposed between the free ends of the auxiliary band, with the ends of the spring anchored in holes formed in the ends of the auxiliary band. The top of the auxiliary band and compression spring 60 are positioned in a chamber 16' formed in the top enlarged head 14' of the band 12', the chamber extending downwardly to a point adjacent the midheight of the band 12'.

In use, when the band 12' is slipped over the finger of the wearer, the spring 60 will permit automatic expansion of the auxiliary band 26' to adjust its diameter to the diameter of the finger of the wearer, thereby holding the ring on the finger against displacement.

FIGS. 10 to 12, inclusive, illustrate a ring 10" embodying modified form of the invention wherein a spool assembly 64 takes the place of the clutch device 36 of the auxiliary band-turning mechanism of the ring 10 of FIG. 1. The spool assembly includes an elongated cylindrical pin 30" with a pair of spaced annular flanges or rings 66, 66 formed thereon inwardly of the ends 68 and 70 thereof. One end, the end 68 is journalled in a hole 32" in the wall 34" of the chamber 16" and the other end, the end 70 is journalled in a similar hole 71 in the other wall 54" of the chamber. The face of the end 70 is formed with a transverse slot 50" to receive the blade 72 of a turning tool 52". A washer 74 with internal teeth 56" is seated in a recess 76 on the inner surface of the wall 54" around the hole 71 therein. The washer is spot welded to the wall as indicated at 78. A flat spring 80 with a curved bifurcated end is fixed to the inner surface of wall 34" with its bifurcations 82 in line with the hole 32" in the wall and normally pressing against the adjacent flange 66 to hold the spool from turning. The ends of the auxiliary band 26" are anchored to the pin 30" similarly to the anchoring in FIG. 1. A collar 42" with external teeth 46" formed thereon is fixed on the pin 30" on the slotted end 70 thereof adapted to mesh with the internally threaded washer 74 as shown in FIG. 10.

In use, the spool assembly 64 is pushed inwardly by tool 52" against the action of spring 80 until the collar 40" is free of the washer 74, whereupon the pin is turned by means of the tool 52" to deform and narrow the diameter of the auxiliary band 26" so that the band grips the finger of the wearer and prevents displacement of the ring 10".

Another finger ring 10a with a modified form of auxiliary band turning mechanism is shown in FIGS. 13 and 14. In ring 10a, the turning mechanism is inserted through the ordinary split in the main band 12a at the enlarged head 14a thereof communicating with the chamber 16a. The turning mechanism comprises a self-contained unit including a cylindrical pin 30a journalled in bearing holes in the inner surfaces of the walls 34a and 54a of the chamber 16a. A pin 88 protrudes radially from the outer surface of the pin 30a at the end thereof adjacent the wall 34a, and an annular member 90 with knurled outer surface 92 is fixed on the other end of the pin, the member constituting a pin-actuating knob. A flat spring 80a is secured to the inner surface of the wall 34a. The free end of the spring is formed with a compound curved free end 94 extending upwardly along the inner surface of the side wall 34a and normally receiving the pin 88 in the indentation thereof as seen in FIG. 14 whereby the spring normally prevents rotation of the pin 30a. The auxiliary band 26a normally seats on the inner surface of the main band 12a and is secured thereto by opposed integral wings 96 looped over the sides of the main band 12a as seen in FIG. 14. The split ends of the auxiliary band are anchored to the pin by welding 30a similarly to band 26 of FIG. 1. An L-shaped bracket 98 has one leg 100 fixed to the bottom surface of wall 54a of the chamber 16, with its other leg 102 extending upwardly along the inner surface of the wall. Leg 102 is formed with a bearing hole 104 to receive the reduced portion of the adjacent end of the pin.

In use, by merely turning the knob 90, the pin 30a is rotated carrying the welded ends 41a, 41a of the auxiliary band 26a around with it thus deforming the auxiliary band and narrowing the diameter thereof for preventing the ring 10a from becoming displaced on the finger of the wearer.

What is claimed is:

1. A finger ring comprising a circular main band, an enlarged head portion at the top of the band, a split auxiliary band carried by the main band on the inner periphery thereof, and means in the head portion for narrowing the diameter of the auxiliary split band whereby the auxiliary band will frictionally engage the finger of the wearer to prevent displacement of the ring on the finger, means for narrowing the diameter of the split band including a rotatable slotted and toothed clutch device, said slotted and tooth clutch device being operable to disengage the clutch part for contracting the auxiliary split band.

2. A finger ring as defined in claim 1 wherein the enlarged head has a chamber therein, a pin supported at one end in the head, the other end of the pin protruding into the chamber, the body of the clutch device being tubular and slidable and rotatably mounted on the protruding end of the pin, the tubular body having an enlarged head enclosing the other end thereof, one side wall of the chamber having an opening therein, the enlarged head of the body of the clutch device slidable in said opening, and means externally of said one side wall for sliding and rotating the clutch device.

3. A finger ring as defined in claim 2 and a compression spring interposed between the protruding end of the pin and the base of the tubular body of the clutch device, teeth on the inner surface of one wall of the chamber, a collar on the inner end of the head and teeth on said collar coacting with teeth on said one wall, said head having a transverse slot in the outer face thereof to receive a turning tool.

4. A finger ring comprising a circular main band, an enlarged head portion at the top of the band, a split auxiliary band carried by the main band on the inner periphery thereof, and means in the head portion for narrowing the diameter of the auxiliary split band whereby the auxiliary band will frictionally engage the finger of the wearer to prevent displacement of the ring on the finger, the head portion being formed with a chamber therein, said chamber having side walls, said side walls having opposed holes therethrough, means for narrowing the diameter of the split band including a slidable and rotatable spool assembly, said spool assembly comprising an elongated slidable and rotatable pin with spaced flanges fixed thereon defining the area for receiving and fastening the split ends of the auxiliary band, the ends of said pin journalled in the holes in the walls of the chamber, one end of the pin being slotted to receive a turning tool, a flat spring fixed on the inner surface of the adjacent side wall of the chamber, said spring having a curved free end normally pressing against the adjacent flange on the pin to prevent sliding of the pin, the side wall of the chamber mounting the slotted end of the pin having a recess in the inner surface thereof around the hole therein, a washer fixed in said recess, said washer having internal teeth thereon, and a collar fixed on the pin adjacent its slotted end adapted to fit in the opening in the washer, said collar having teeth coacting with the internal teeth on the collar to prevent rotation of the pin.

5. A finger ring comprising a circular main band, an enlarged head portion at the top of the band, a split auxiliary band carried by the main band on the inner periphery thereof, and means in the head portion for narrowing the diameter of the auxiliary split band whereby the auxiliary band will frictionally engage the finger of the wearer to prevent displacement of the ring on the finger, the enlarged head being split communicating with a chamber therein, said chamber having opposing side walls, means for narrowing the diameter of the split band comprising a self-contained unit including a cylindrical pin extending across the space between the side walls, an L-shaped bracket having two legs, one leg fixed on the inner end of one side wall, the other leg extending along the inner chamber surface of said one side wall, said latter leg having a hole therethrough, the other side wall of said chamber having an opposed hole therein, the ends of the cylindrical pin being journalled in said opposed holes, a pin protruding radially from the end of the cylindrical pin adjacent the other chamber side wall, a spring fixed on the inner surface of said other chamber side wall, said spring having a free curved end coacting with the radial pin for preventing sliding movement of the cylindrical pin, the split auxiliary band being secured to the main band by integral wings looped around the main band, the free ends of the split band anchored to the cylindrical pin midway its ends, and an annular knurled knob fixed on the cylindrical pin for manual rotation thereof.

References Cited

UNITED STATES PATENTS

| | | | |
|---|---|---|---|
| 1,115,764 | 11/1914 | Applis | 63—15.6 |
| 2,707,828 | 5/1955 | Stewart | 63—15.5 XR |
| 3,150,505 | 9/1964 | Olson | 63—15.6 |

ROBERT PESHOCK, Primary Examiner

U.S. Cl. X.R.

63—15